Dec. 27, 1938.   C. F. WRIGHT   2,141,581
MACHINE FOR MAKING BOOK MATCHES AND THE LIKE
Original Filed Oct. 5, 1935   19 Sheets-Sheet 2

Dec. 27, 1938.   C. F. WRIGHT   2,141,581
MACHINE FOR MAKING BOOK MATCHES AND THE LIKE
Original Filed Oct. 5, 1935   19 Sheets-Sheet 3

Dec. 27, 1938.                C. F. WRIGHT                2,141,581
           MACHINE FOR MAKING BOOK MATCHES AND THE LIKE
              Original Filed Oct. 5, 1935    19 Sheets-Sheet 5

Dec. 27, 1938. C. F. WRIGHT 2,141,581
MACHINE FOR MAKING BOOK MATCHES AND THE LIKE
Original Filed Oct. 5, 1935 19 Sheets-Sheet 6

Dec. 27, 1938.  C. F. WRIGHT  2,141,581

MACHINE FOR MAKING BOOK MATCHES AND THE LIKE

Original Filed Oct. 5, 1935   19 Sheets-Sheet 7

Inventor
Charles F. Wright
by his Attorney
John R. Nolan

Dec. 27, 1938. C. F. WRIGHT 2,141,581
MACHINE FOR MAKING BOOK MATCHES AND THE LIKE
Original Filed Oct. 5, 1935 19 Sheets-Sheet 9

Inventor
Charles F. Wright
by his Attorney
John T. Nolan

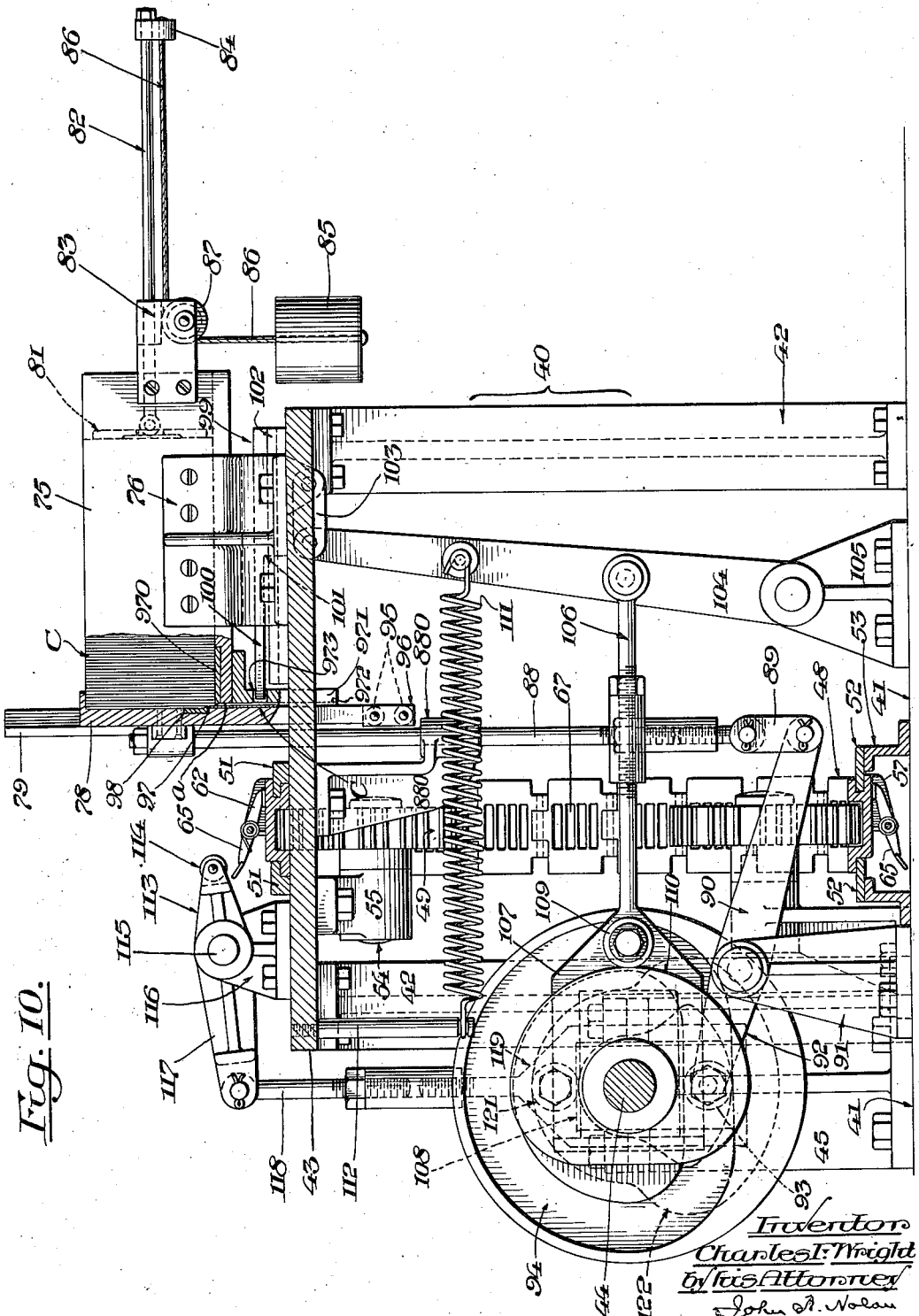

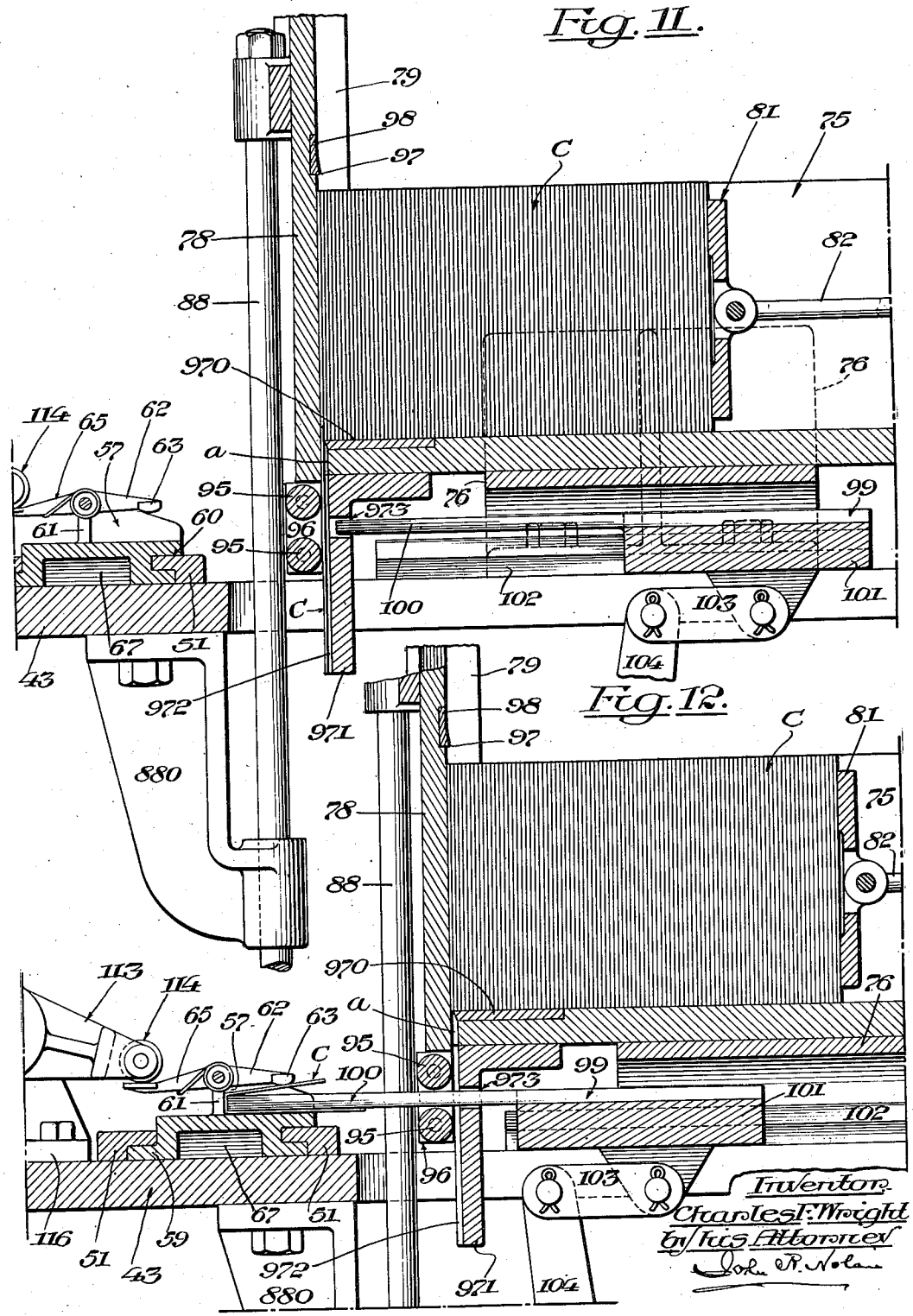
Dec. 27, 1938.  C. F. WRIGHT  2,141,581
MACHINE FOR MAKING BOOK MATCHES AND THE LIKE
Original Filed Oct. 5, 1935  19 Sheets-Sheet 11

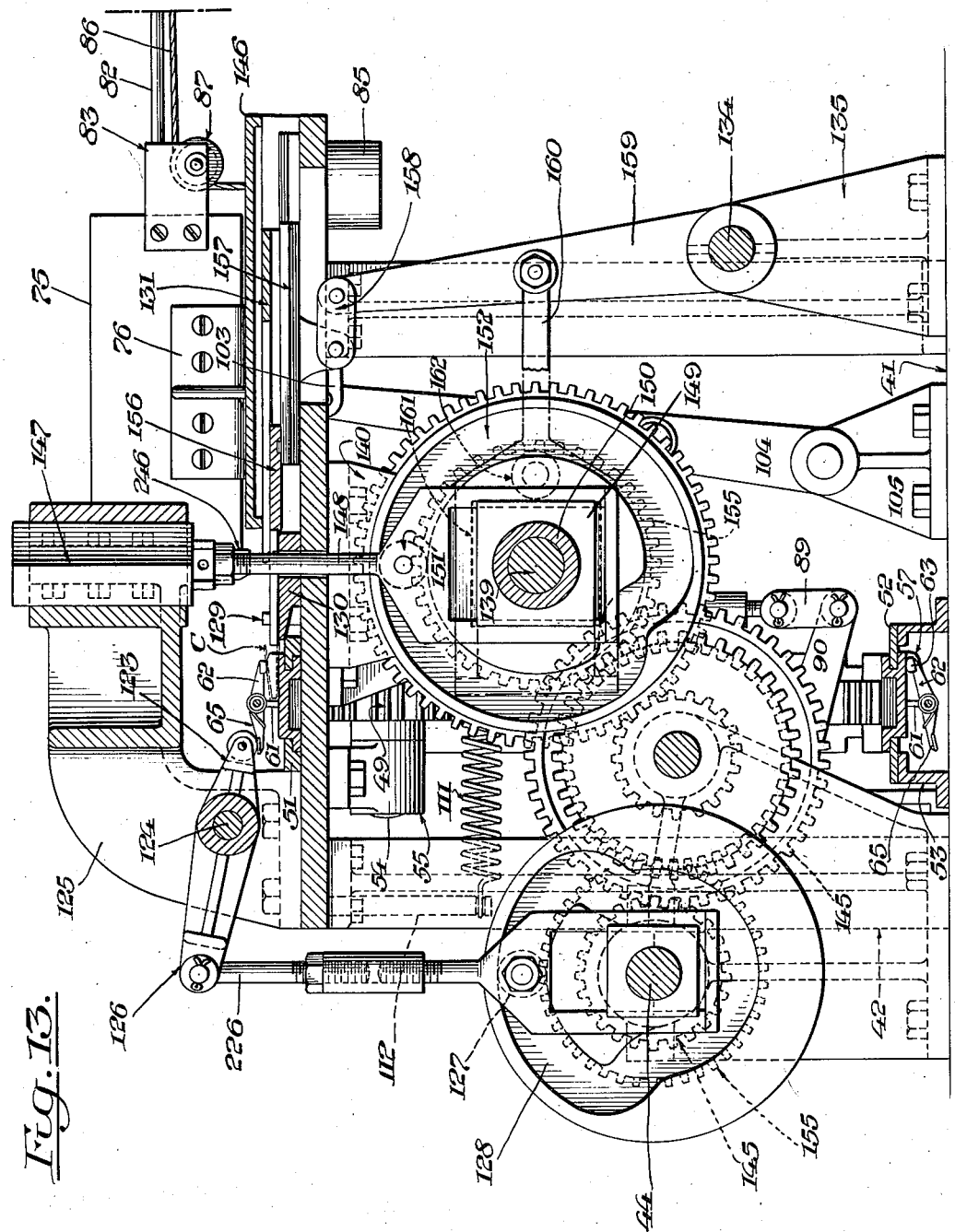

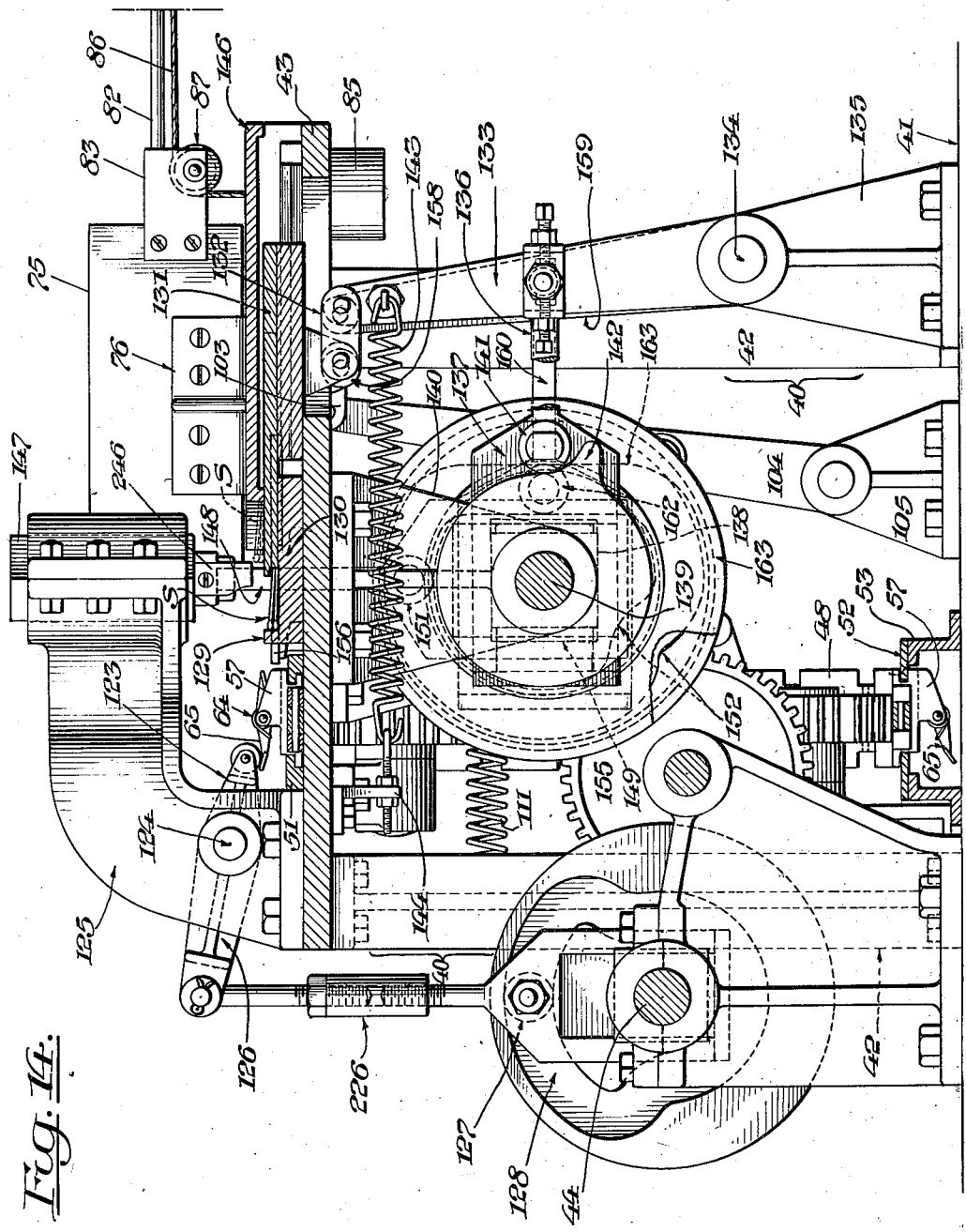

Dec. 27, 1938.   C. F. WRIGHT   2,141,581
MACHINE FOR MAKING BOOK MATCHES AND THE LIKE
Original Filed Oct. 5, 1935   19 Sheets-Sheet 14

Inventor
Charles F. Wright
by his Attorney

Dec. 27, 1938.  C. F. WRIGHT  2,141,581

MACHINE FOR MAKING BOOK MATCHES AND THE LIKE

Original Filed Oct. 5, 1935   19 Sheets-Sheet 15

Inventor
Charles F. Wright
by his Attorney
John R. Nolan

Dec. 27, 1938.  C. F. WRIGHT  2,141,581
MACHINE FOR MAKING BOOK MATCHES AND THE LIKE
Original Filed Oct. 5, 1935   19 Sheets—Sheet 16
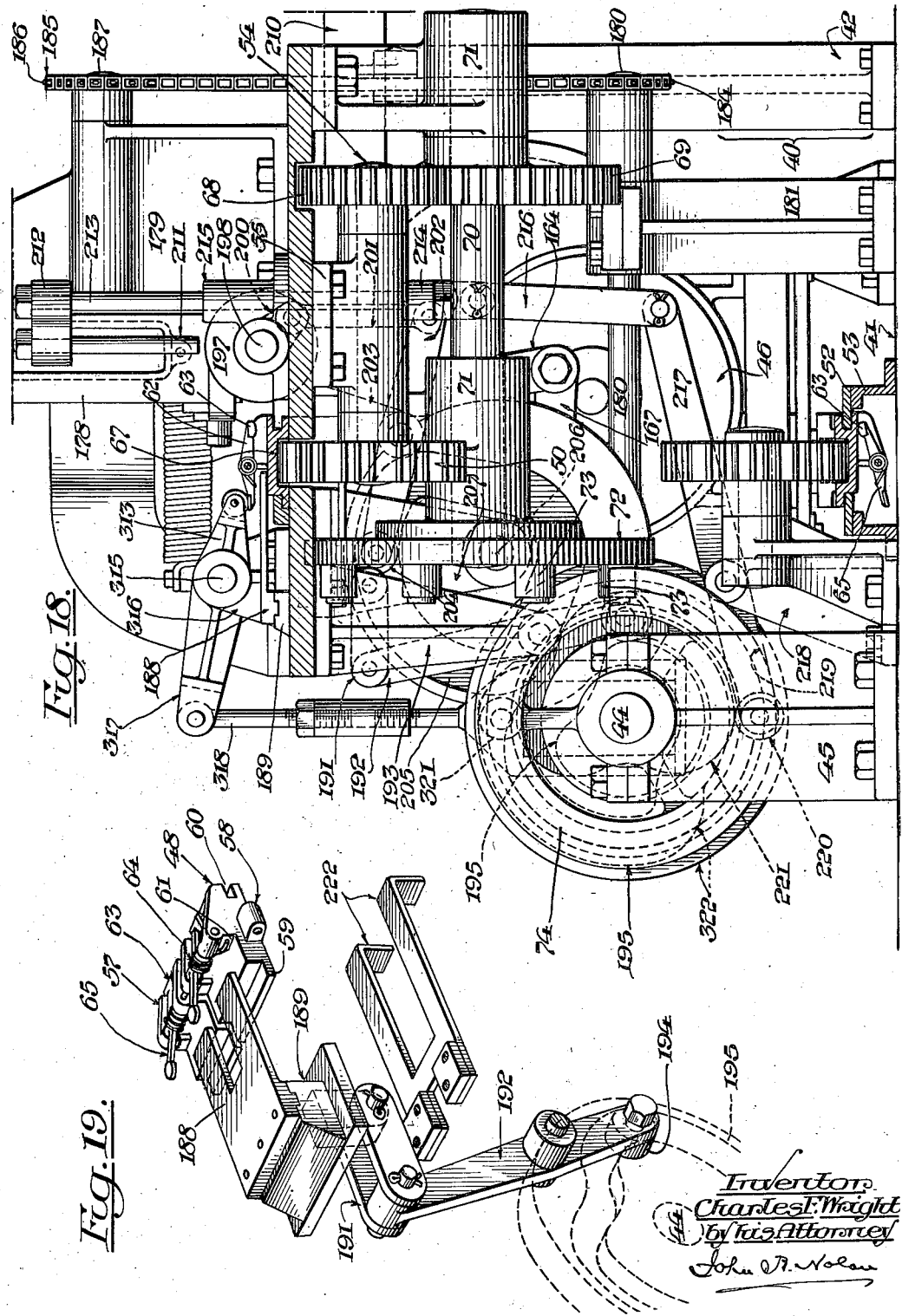

Dec. 27, 1938.   C. F. WRIGHT   2,141,581
MACHINE FOR MAKING BOOK MATCHES AND THE LIKE
Original Filed Oct. 5, 1935   19 Sheets-Sheet 17
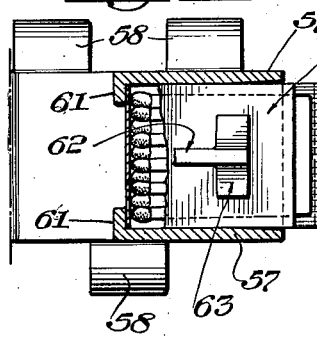
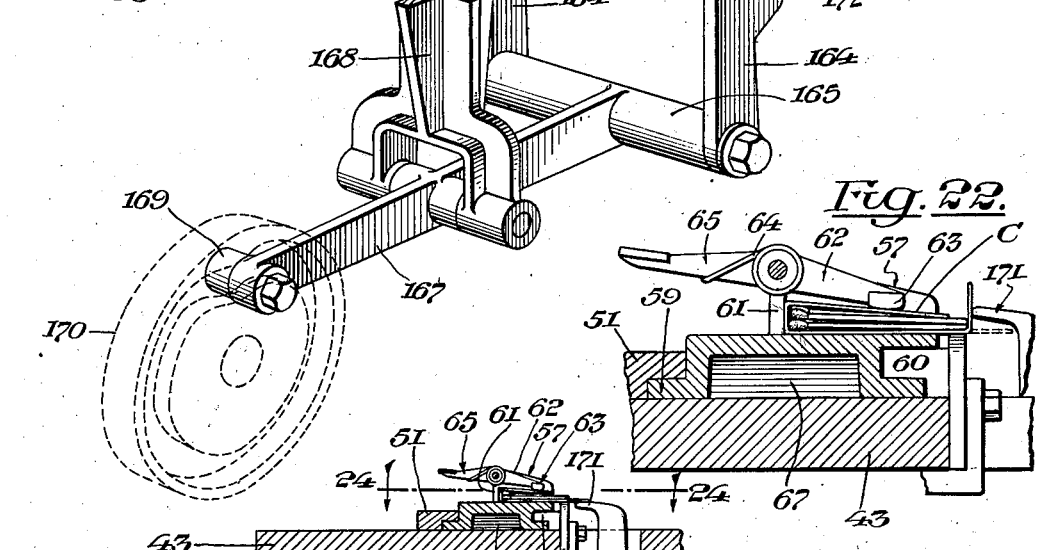
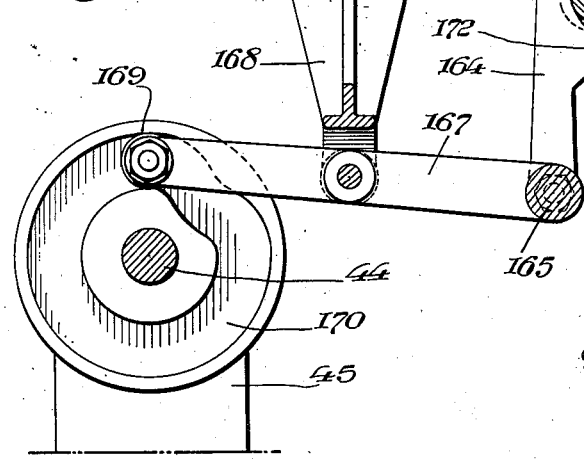

Dec. 27, 1938.  C. F. WRIGHT  2,141,581
MACHINE FOR MAKING BOOK MATCHES AND THE LIKE
Original Filed Oct. 5, 1935  19 Sheets-Sheet 18
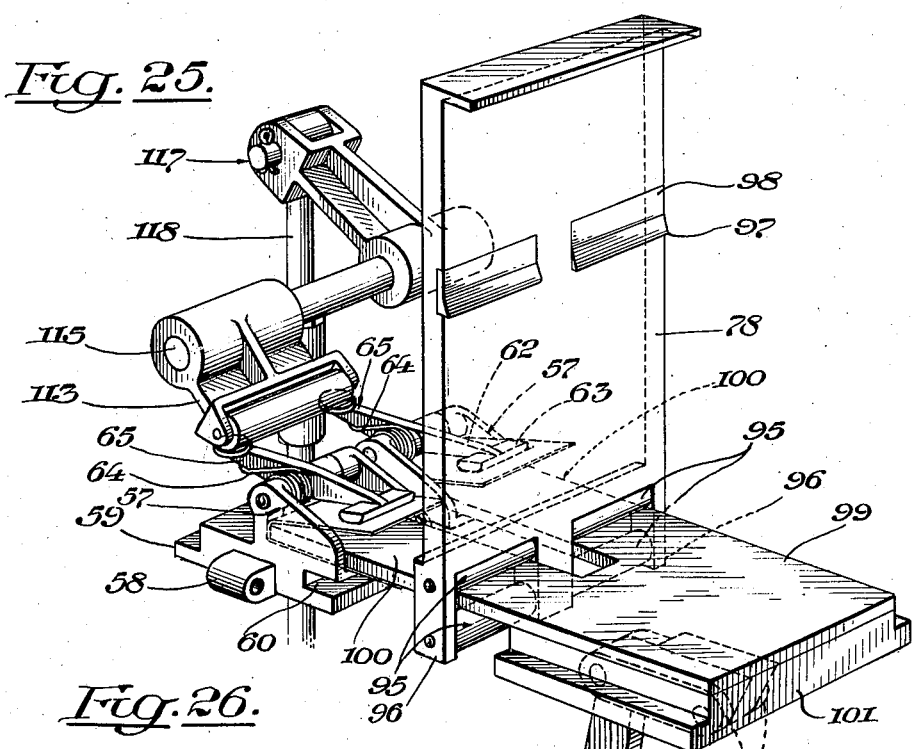
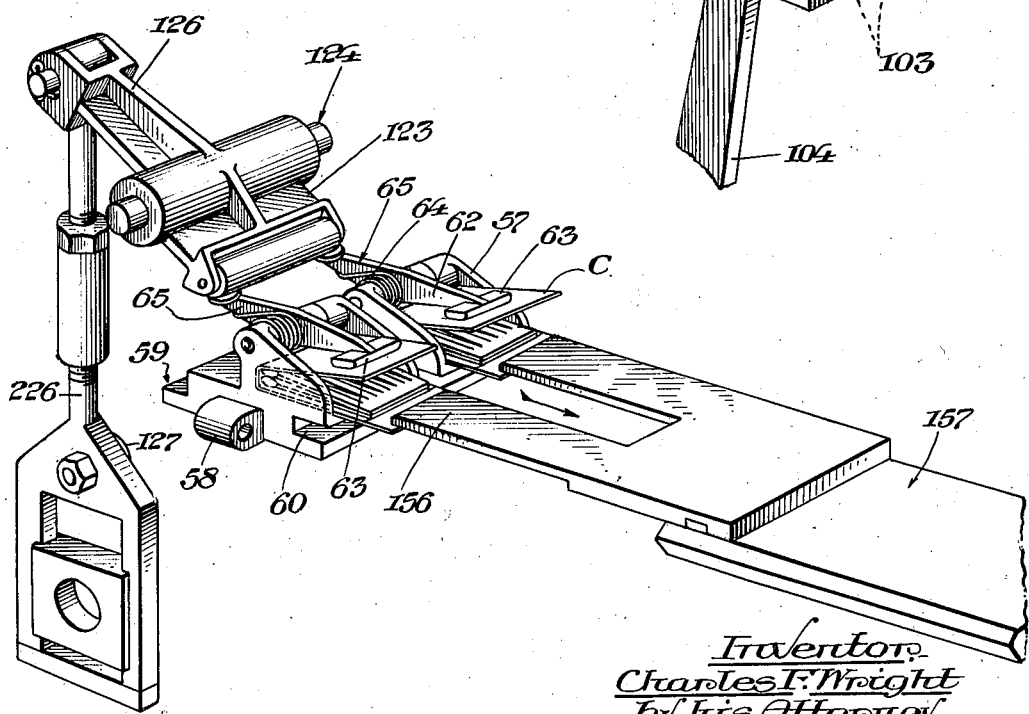

Dec. 27, 1938.  C. F. WRIGHT  2,141,581
MACHINE FOR MAKING BOOK MATCHES AND THE LIKE
Original Filed Oct. 5, 1935  19 Sheets-Sheet 19
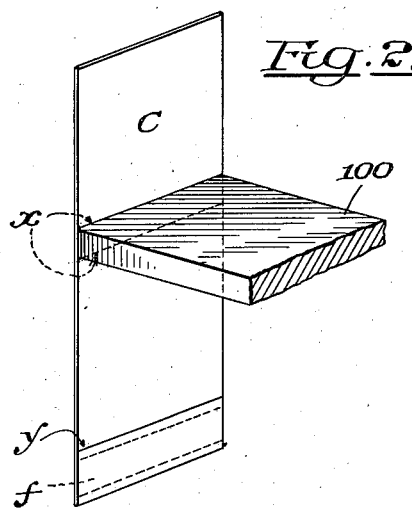
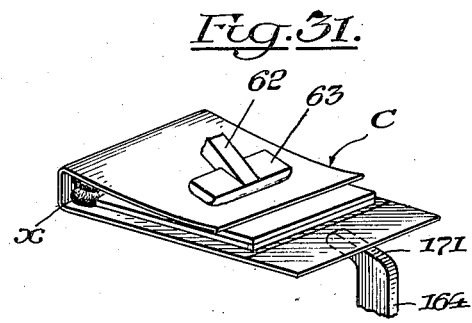
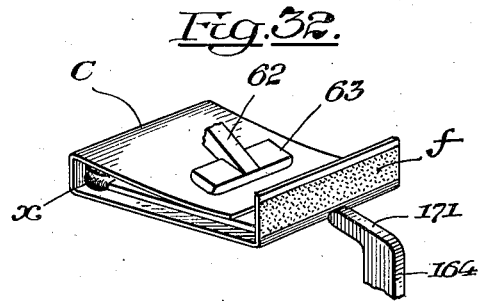
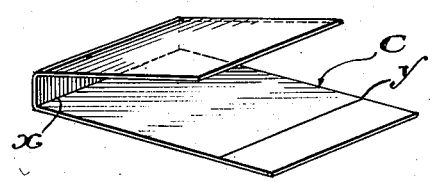
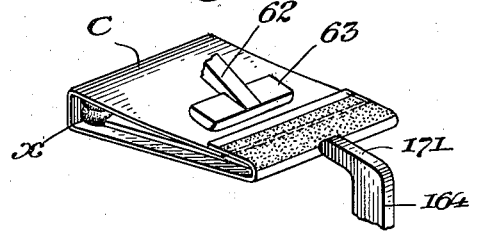
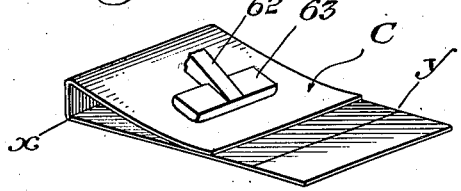
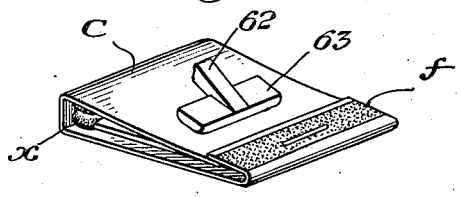
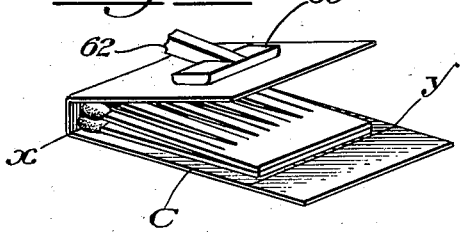
Inventor
Charles F. Wright
by his Attorney
John R. Nolan Patented Dec. 27, 1938

2,141,581

UNITED STATES PATENT OFFICE 2,141,581

MACHINE FOR MAKING BOOK MATCHES AND THE LIKE

Charles F. Wright, Akron, Ohio, assignor, by mesne assignments, to The Diamond Match Company, a corporation of Delaware Application October 5, 1935, Serial No. 43,709
Renewed May 25, 1938

6 Claims. (Cl. 93—7)

This invention relates to machines for making booklike packets of the kind in which individually removable splints are contained in a folded flexible cover, such, for example, as advertising book matches wherein the butts or uncut ends of the cards of matches of each packet are stapled or otherwise secured to the short end fold of relatively stiff flexible material which provides a cover including a hinged flap whereof the free end when the flap is closed is removably held between the butt or butts of the match cards and the overlying short fold of the cover. The outer surface of such fold is usually coated with ignition material for the striking of each individual match when it is removed from a card.

The object of my invention is to provide a machine of novel and efficient construction and operation whereby the elements of packets of the kind specified are more rapidly and economically assembled and fastened together than heretofore.

Other objects of the invention will hereinafter appear.

The machine herein illustrated to exemplify the principle of my invention is designed for use in the production of book matches of the character specified, which machine, briefly described, comprises a carrier embodying an intermittently movable endless chain of clamp elements; means for opening and closing the clamps at stated intervals in the intermittent progress of the carrier; cover supply means embodying devices whereby cover blanks are separately folded and at the same time positioned flatwise in the open clamps with the free ends of the lower folds having the ignition material projecting beyond those of the upper folds, which clamps are then closed to hold the folded blanks securely in place during an interval in the subsequent progress of the carrier; match card supply means embodying devices whereby, when the clamps are again opened, the cards are inserted between the folds of the contained covers, so that when the clamps are again closed the associated cards and covers are held in place in the continued progress of the carrier; means whereby the projecting ends of the lower folds of the covers, thus associated with the cards, are folded in overlapping relation upon the respective upper folds of the covers; means whereby such folded ends and the associated match cards are stapled or otherwise fastened together, and, finally, means whereby the thus finished match books are discharged from the carrier when the clamps are again opened during a subsequent dwell of the carrier.

The construction, organization and operation of the mechanisms just referred to will be hereinafter described in detail, and the scope of my invention then expressed in the appended claims; it being understood that the invention is not limited to the specific form or forms of mechanisms herein disclosed, as the same may be modified within the principle of the invention.

In the drawings—

Figures 1, 2 and 3 are succeeding views of a complete book-match machine in rear elevation; Fig. 1 showing the receiving end of the endless cover-carrier and the clamp controlling mechanism therefor; the cover-supply troughs, and mechanism associated therewith; Fig. 2 showing a continuation of the carrier; means for supplying match cards to the covers therein, and the associated mechanisms, and Fig. 3 showing the remainder of the carrier; mechanism for stitching associated match cards and covers clamped in the carrier; the mechanism for discharging the finished match books from the carrier, and associated mechanism.

Figure 1:
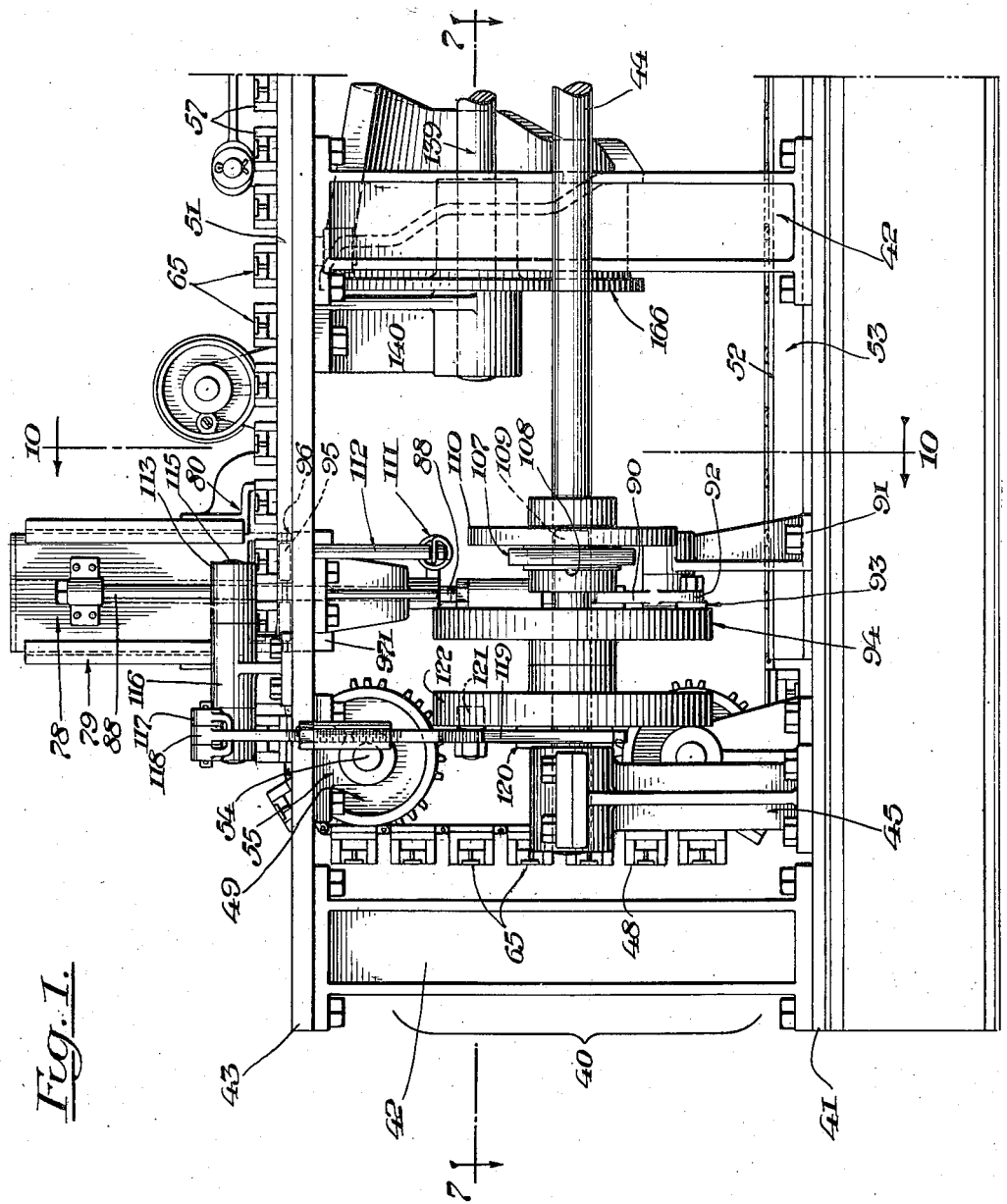

Fig. 10 is a transverse vertical section through the machine, as on the line 10—10 of Fig. 1, at one side of the cover troughs, a part of which side is broken away to show the contained covers, the stripper plate constituting the front wall of the trough being shown in down position and a cover positioned in front of the carrier preparatory to the upward return of the plate and the rearward delivery of the cover in folded condition to the carrier by the cover pusher.

Fig. 11 is a vertical section through the trough table, cover pusher and carrier link with open clamp, showing the stripper plate raised and its folding rolls positioned for the passage therebetween to the link, of the previously depressed cover when it is forced rearward by the pusher.

Fig. 12 is a similar view, showing the cover pusher in its rearward position and the cover folded and inserted in the carrier link.

Figure 2:
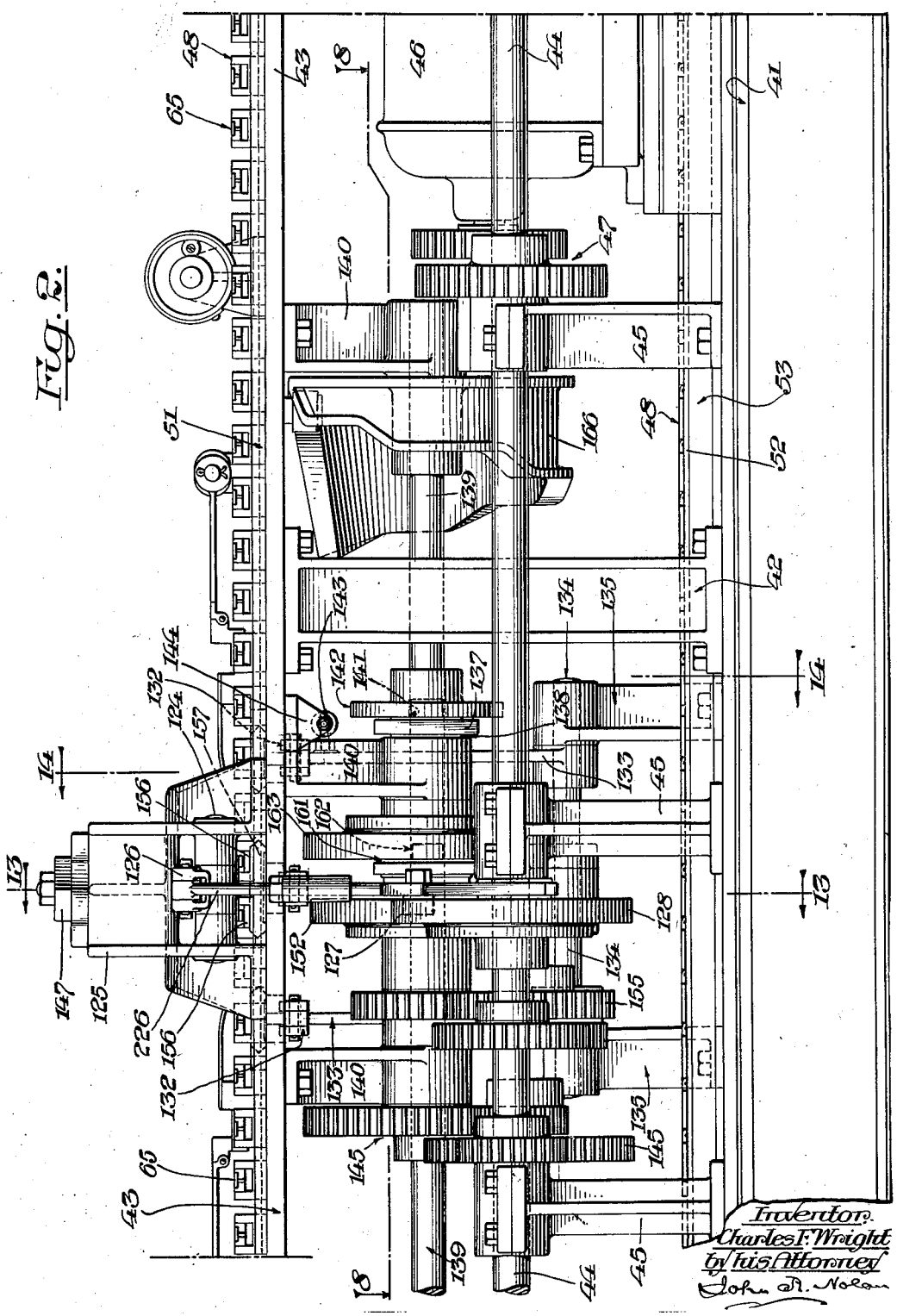

Fig. 13 is a transverse vertical section of the machine in a plane through the match card inserting mechanism, as on the line 13—13 of Fig. 2.

Fig. 14 is a similar section of the machine through the match strip feeding mechanism, as on the line 14—14 of Fig. 2.

Figure 3:
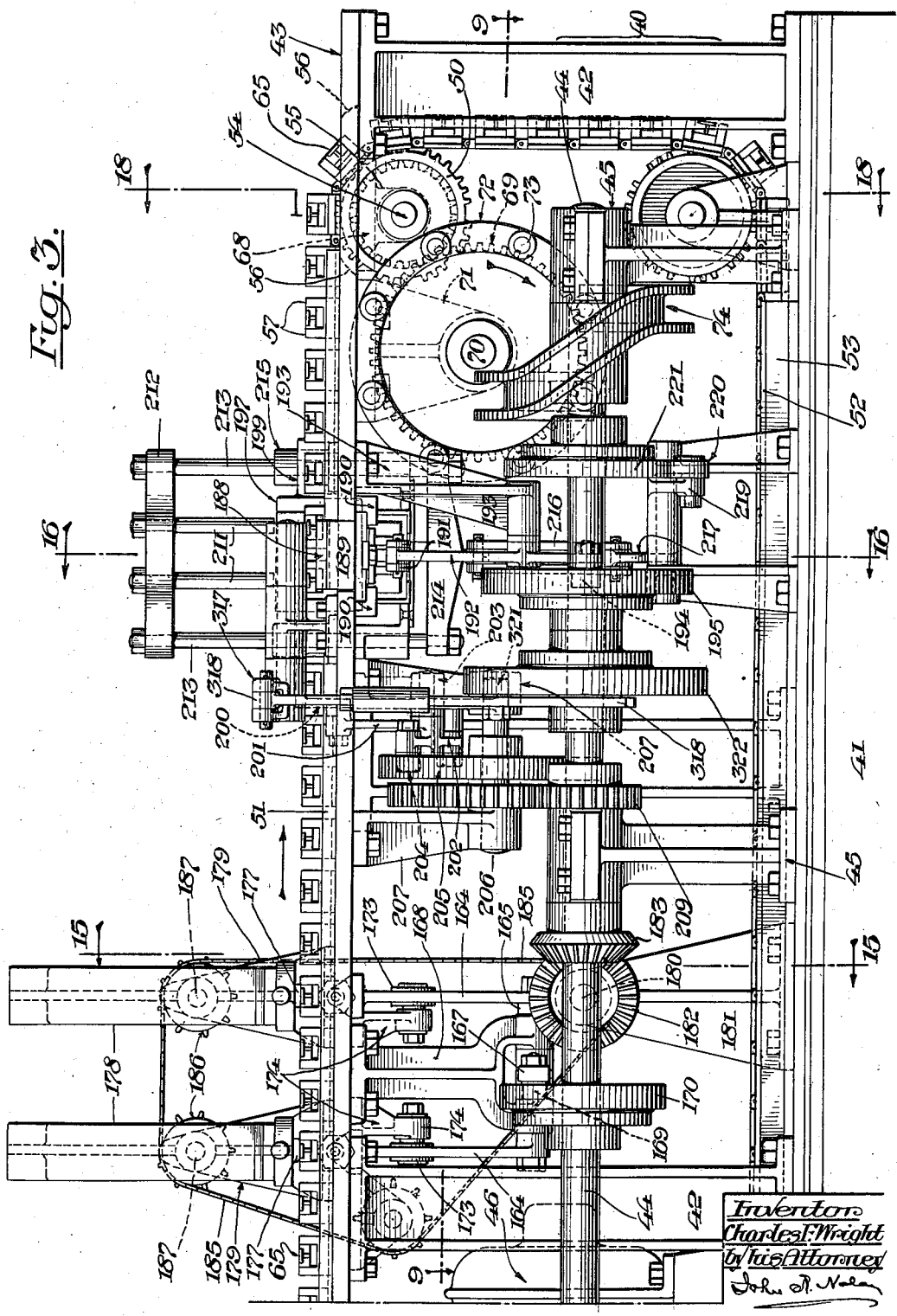
Figure 15:
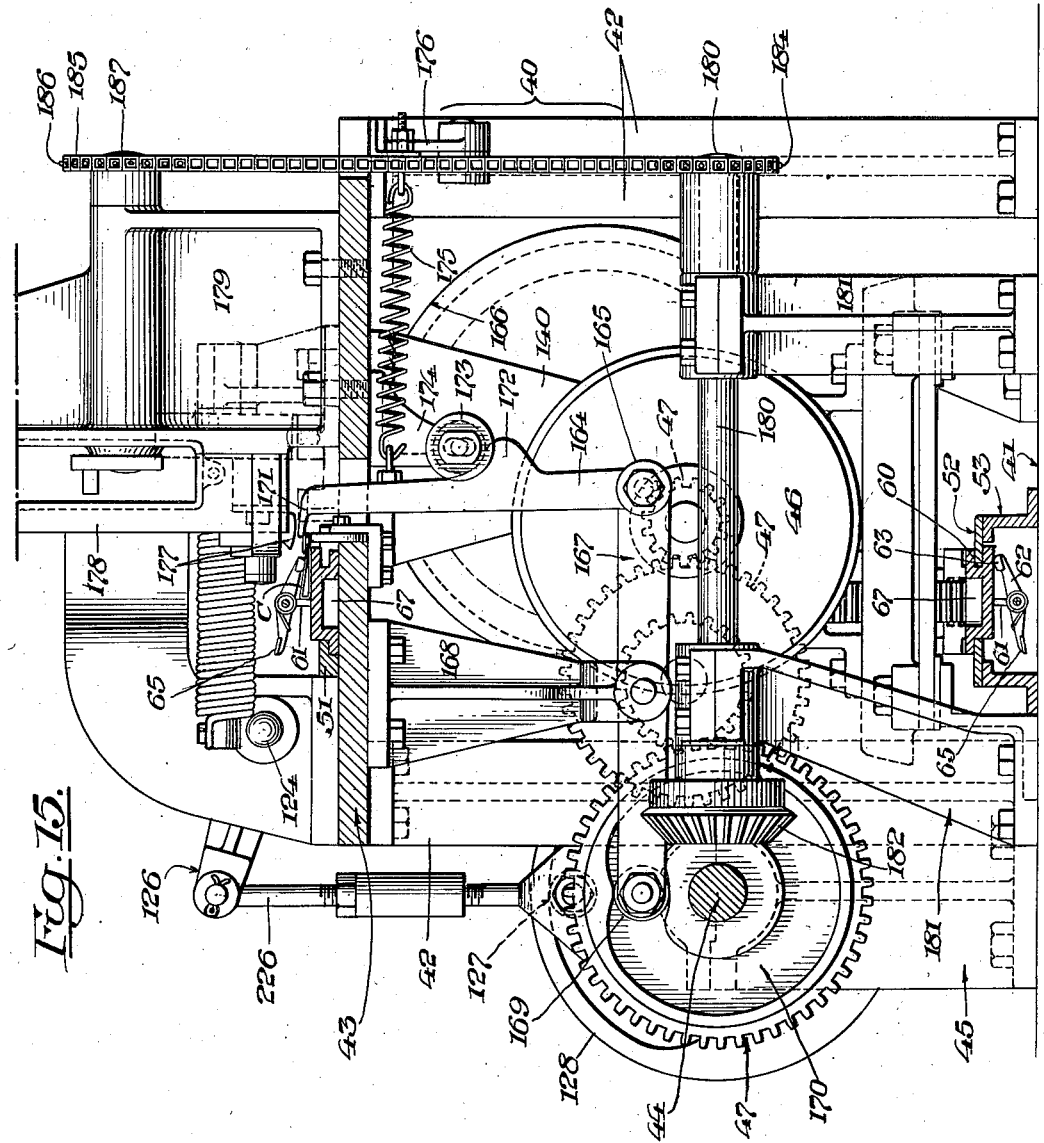

Fig. 15 is a similar section of the machine adjacent the stitching mechanism for the associated match cards and covers, as on the line 15—15 of Fig. 3, showing one of the cover folding fingers and the actuating mechanism therefor.

Figure 16:
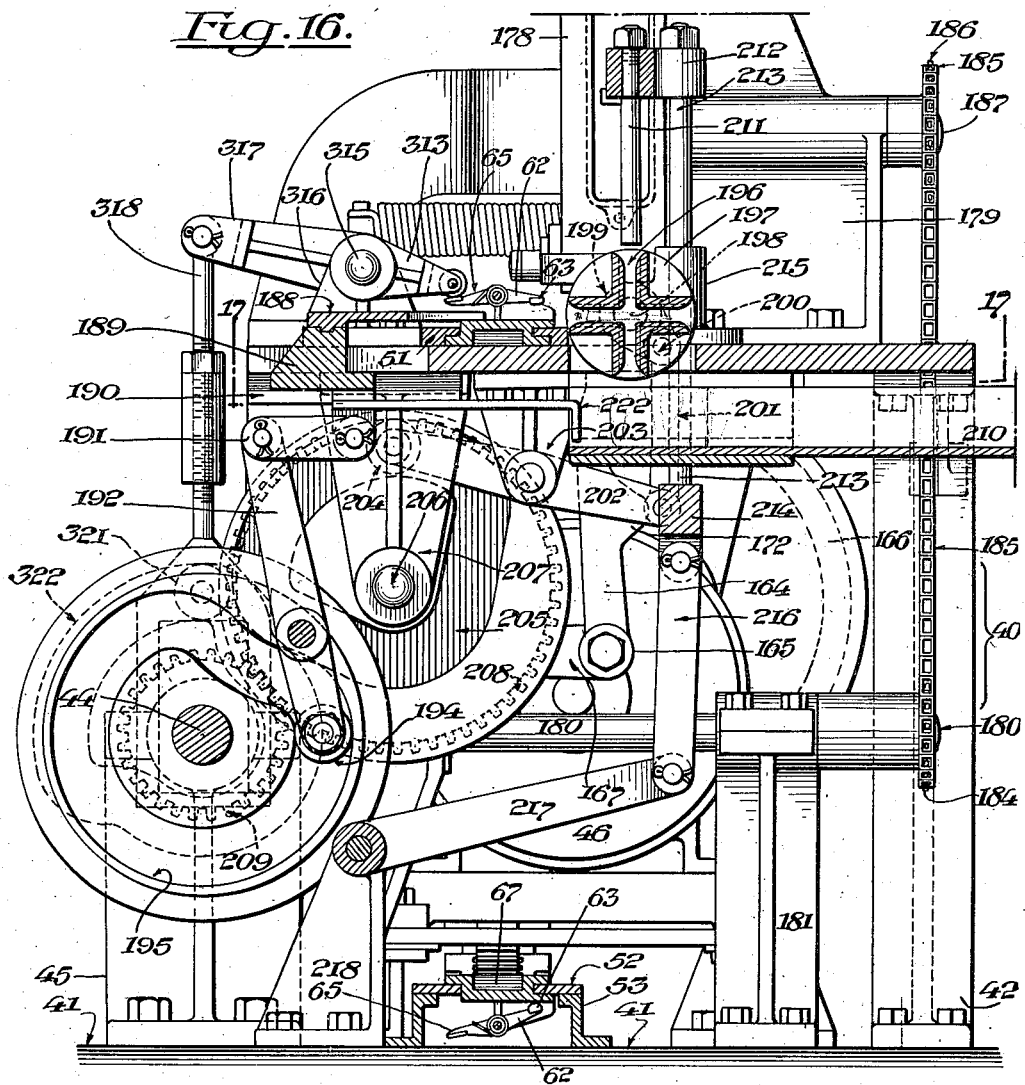

Fig. 16 is a similar section of the machine in a plane through the mechanism for ejecting the finished match books from the carrier, as on the line 16—16 of Fig. 3, showing a book reversing turret and discharge troughs for the books.

Figure 17:
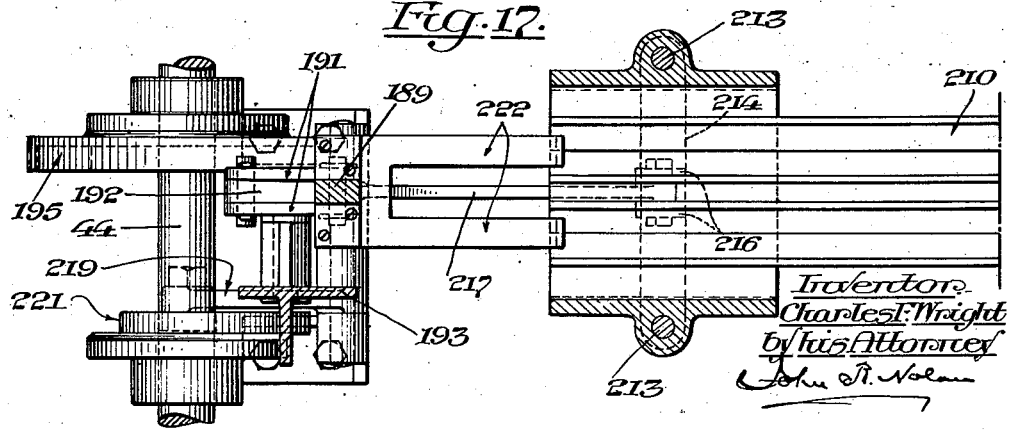

Fig. 17 is a horizontal section through the book ejecting mechanism and directly above the discharge troughs, as on the line 17—17 of Fig. 16.

Fig. 18 is a transverse vertical section of the discharge end of the machine, in a plane adjacent cam and pin wheel mechanism for actuating the carrier, as on the line 18—18 of Fig. 3.

Fig. 19 is a perspective view of the match book ejecting devices, and adjuncts.

Fig. 20 is a similar view of the finger mechanism for tending the coated end fold of the cover.

Fig. 21 is a transverse vertical section of a carrier link with a cover and match cards clamped therein, and also a portion of the table, and the finger mechanism, which latter is shown in its position preparatory to the bending of the end fold of the cover.

Fig. 22 is a partial section, showing the acting end of the finger as raised to bend the opposing cover fold upward.

Fig. 23 is a similar view, showing the acting end of the raised finger as moved forward and bending the end fold upon the opposing butts of the match cards and upon the free end of the upper fold of the cover.

Fig. 24 is a horizontal section through the link, as on the line 24—24 of Fig. 21.

Fig. 25 is a perspective view of a pair of open clamping links at the cover inserting station, showing the vertically reciprocating stripper plate for successively depressing the covers, and also the reciprocating pusher for forcing the depressed covers between the lower roll members of said plate and into the open links.

Fig. 26 is a similar view of a pair of open clamping links at the match card inserting station, showing associated covers and cards in the links, and also the reciprocating pusher for the cards.

Figs. 27 to 34, inclusive, illustrate succeeding steps in the formation of the match book; Fig. 27 showing one of the vertically-disposed covers and the reciprocating pusher member adjacent thereto; Fig. 28 showing the cover as initially folded; Fig. 29 showing the top fold depressed by the link clamp; Fig. 30 showing the top fold raised and the match cards inserted between the two folds; Fig. 31 showing the top fold depressed upon the previously inserted match cards, and the projecting end portion of the lower fold positioned over the acting end of one of the folding fingers; Fig. 32 showing the end portion as bent up by the action of the finger; Fig. 33 showing such end portion as folded over the cards and the adjacent free end of the top fold, and Fig. 34 showing the finished book as clamped.

Referring to the drawings 40 designates a suitable supporting frame comprising a bed 41, standards 42 and a table 43; 44 designates a main power driven shaft extending longitudinally of the frame, which shaft has its bearings in boxes supported by standards 45 on the bed, and 46 designates a suitably disposed electric motor appropriately connected by reduction gearing 47 with the shaft 44. (See Figs. 1, 2 and 3.)

An endless chain of clamp links 48, constituting a cover and card carrier, passes about sprocket wheels 49 and 50 at the respective ends of the bed; the upper horizontal run of the chain travelling along the top of the table and between spaced parallel guides 51. The lower run of the chain travels beneath the table and is supported by guides 52 on a longitudinally extending casing 53 on the bed 41. The shafts 54 of the sprocket wheels have their bearings in suitably-disposed hangers 55 beneath the table, which table has openings 56 therein for the passage of the chain and the sprocket wheels.

Each link of the carrier, in the form illustrated, comprises a substantially rectangular body having spaced walls 57 to provide a pocket into which a folded cover C can be placed flatwise, as will presently appear, and having also perforated ears 58 by means of which the adjacent links are hingedly connected by pivot pins. The respective ends of the link body are tongued, as at 59, and grooved, as at 60, for sliding engagement with the upper and lower guides 51 and 52.

The walls 57 terminate at the rear of the pocket in interior angular corner portions 61 between which is pivoted a lever whereof the forward arm 62 overhangs the link body in the space between the walls and is provided with a foot 63 which is normally urged toward the top of the body by the action of a suitably disposed spring, such, for example, as a torsion spring 64 which is coiled on the hub of the lever. One end of the spring bears against the adjacent corner portion 61 and the other end bears against the underside of the rearward lever arm 65. (See Figs. 21 to 24, inclusive.) Means whereby the levers of the respective link members are periodically moved to unclamping relation with the body of the link and released to resume their clamping relation will be hereinafter described.

The carrier is intermittently actuated by any suitable mechanism, the extent of each step being equal to the width of two adjoining links. In the present instance, the sprocket wheel 50 meshes with gear teeth 67 formed in the under sides of the respective links of the carrier, and the shaft 54 of this wheel bears a pinion 68 which meshes with a spur wheel 69 on an adjacent shaft 70 having its bearings in hangers 71 depending from the table. Fast on the shaft 70 is a pin wheel 72 with the pins 73 of which successively engages a cam 74 on the main shaft; the contour of the cam groove being such that the pin wheel is intermittently advanced step-by-step, the movement occurring during approximately one-half rotation of the main shaft and the dwell during the remainder of the rotation. The ratio of the gearing is such that the requisite two-link movement of the carrier is transmitted thereto during each step of the pin wheel. (See Figs. 3 and 18.)

Mechanism for supplying the covers in pairs and for feeding them simultaneously in folded condition to two links of the carrier during each dwell of the latter, is arranged at one end of the machine, and means in co-operative relation to said mechanism is provided whereby during each dwell of the carrier the levers of the succeeding pair of links which are positioned to receive the covers are raised against the action of their springs, and then upon the insertion of the folded covers in the links the levers are released, thus grasping the underlying folded covers and preventing their displacement in the links as the carrier continues its travel.

As seen in Fig. 27 each of the match book covers (C) comprises a rectangular piece of flexible card material whereof the outer (usually printed) face is preferably coated at one end with ignition or friction material, $f$, for the striking of individual matches, and whereof the inner face is transversely creased or scored at properly spaced intervals, as at $x$ and $y$, to facilitate the folding of the body of the cover and the coated end portion thereof in the production of the match book.

The preferred form of cover supply mechanism illustrated embodies a trough structure 75 which is positioned rearward of and at right angles to the path of the upper run of the carrier, and is supported by brackets 76 rising from the table. This structure is provided throughout its length with a central partition 77, thus affording two parallel troughs of proper dimensions to receive and guide two packs of covers C, those of each pack being placed face to face in vertical position with the coated friction ends of the covers down and their outer (or printed) sides facing the carrier.

The distance from the center of one trough to the center of the other trough is equal to the distance from the center of one link of the carrier to the center of the next link, the respective troughs being in co-operative relation to two adjoining links during each dwell of the carrier.

The front of the troughs is constituted by a vertically movable plate 78 which is slidably mounted in guides 79 supported by brackets 80 on the table. Backer plates 81 constituting followers are arranged within the troughs so as to press flatwise against the rearward covers of the respective packs. These followers are pivoted to the forward ends of rods 82 which extend slidably through a guide bracket 83 on the rear of the trough structure, and are connected at their outer ends by a cross-bar 84. A counterweight 85 suspended from a looped cable 86 which is trained about a sheave 87 in the bracket 83 and is secured to the cross-bar 84, exerts a constant forward pressure on the latter and the followers, thus forcing the respective packs of covers tightly against the slide plate 78. Secured to this plate is the upper end of a depending rod 88 which is guided in a suitably-disposed bracket 880 beneath the table. The lower end of the rod is pivotally connected by means of a link 89 with one arm 90 of a rock-lever which, in turn, is pivotally mounted on a post 91 rising from the bed 41. The other arm 92 of the lever is provided with a roll 93 which is operatively fitted in the race of a face cam 94 fast on the main shaft 44; the contour of the cam being such that the lever is oscillated and the slide plate 78 reciprocated in timed relation to the carrier; that is to say, during each succeeding movement of the carrier the slide plate is lowered and raised, remaining in its raised position during each succeeding dwell of the carrier. (See Figs. 1, 4, 10, 11, 12 and 25.)

The slide plate is bifurcated at its lower end and provided with horizontal rolls 95 arranged in pairs in spaced parallel relation, which rolls are journaled in the depending extensions 96 of the plate. These rolls are so located in reference to the respective troughs that when the plate is in its raised position the tops of the lower rolls are in the same horizontal plane, or substantially so, as the bottoms of the pockets of the links in the upper run of the carrier, as seen in Figs. 11 and 12.

The inner face of the plate 78, which may be termed a stripper, is provided above its mid-section with thin transverse lips or shoulders 97 which are preferably formed on metallic inserts 98. These lips or shoulders project about the thickness of a cover beyond the face of the plate 78 and are so arranged that when the plate is in its raised position the lips overhang the foremost covers of the respective packs. Hence in the downward stroke of the plate the lips engage the upper edges of the two opposing covers and push them bodily down to or near the bottom of the trough structure so that they depend directly in the rear of the rolls 95 when the plate is raised; the covers extending somewhat farther below than above the center of the space between the rolls.

The rearward ends of the floors of the trough structure adjacent the path of the plate 78 are offset, as at $a$, to provide channels which permit the descent of the rearmost cards through and below the trough, which floors have therein metal inserts 970 constituting throat pieces.

The depending portion 971 of an angular member, which is secured to the bottom of the trough structure adjacent the path of the plate 78, has formed in its rearward face vertical guide channels 972 which receive the respective depending covers and afford an efficient backer therefor.

When the plate 78 is raised after the depression of the covers the carrier is at rest. At this stage the depressed covers are pushed forwardly through the space between the rolls 95, and thereby folded and introduced in that condition into the pockets of the adjacent links of the carrier, the clamping levers on such links having previously been raised as above mentioned and as hereinafter more fully described to permit the free entrance of the folded covers in the pockets of the links.

The means herein illustrated for folding the covers and inserting them in the links comprises a horizontal plate 99 (Figs. 10, 11, 12 and 25) having a bifurcated forward portion which affords two pusher members 100 reciprocable through transverse slots 973 in the backer 971 and between the pairs of rolls 95 and into the pockets of the two adjacent links during a dwell of the carrier. The plate 99 is supported by a crosshead 101 which is slidably mounted in guides 102 on the table and is pivotally connected by means of a link 103 to the upper end of an upstanding rock arm 104 which is pivoted at its lower end on a bracket 105 on the bed 41. Pivoted to the rock arm 104 is one end of an actuating rod 106, the other or forward end of which has an expanded bifurcated portion 107 slidably supported on a rocker block 108 loose on the main shaft. The expanded portion of the rod is provided with a roll 109 which is held in contact with the periphery of a cam 110 fast on the main shaft, by means of a spring 111 secured at its ends to the rock arm 104 and a pin 112 depending from the table.

The contour of the cam 110 is such that at the proper interval of time it permits the spring to retract and yieldingly pull forward the arm 104, together with the cross-head 101 and the plate 99. In this movement the pusher members 100 strike the opposing vertically disposed covers between the score lines $x$ (Fig. 27), thus forcing such covers between the rolls 95 and bending the material on the score lines; and in the continued forward movement of the pusher plate the folded covers are inserted in the pockets of the respective opposing links of the carrier. Thereupon the rod 106 and its connections are positively moved rearward by the cam, against the action of the spring, thus returning the cross-head 101 and plate 99 to their rearward position in readiness for a similar operation on a pair of depending covers in the next succeeding dwell of the carrier.

It is to be noted that the acting ends of the pusher members 100 just fit the spaces between the score lines $x$ of the respective covers, and therefore the act of forcing the covers between the rolls 95 bends the cover material on such lines, and resiliently presses it squarely against the angular corner portions 61 of the pockets of the links in a manner to produce a well-formed square end on each folded cover. (See Figs. 22, 23, 24 and 27.)

Figure 4:
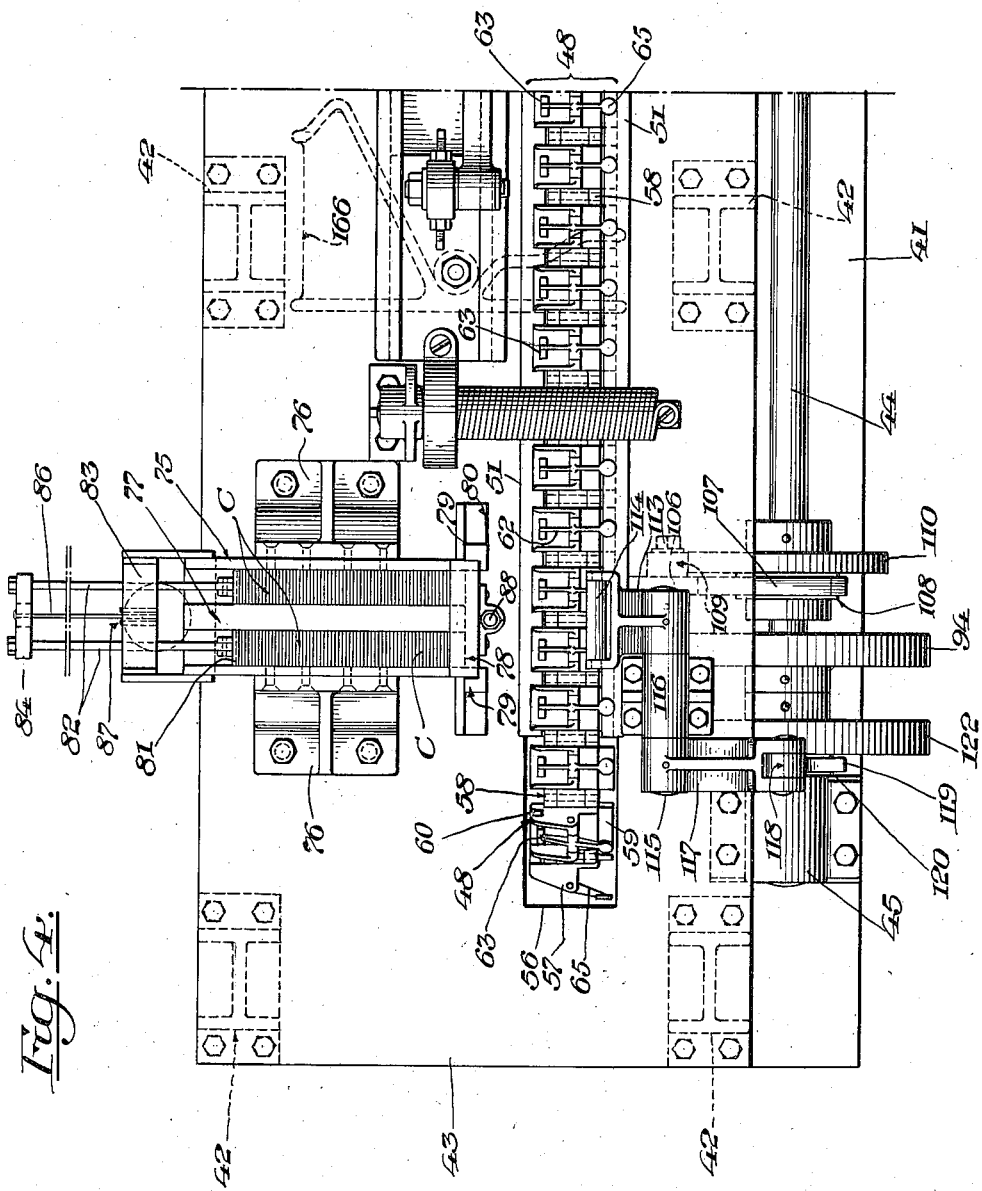
Figs. 4, 5 and 6 are plan views of the mechanisms shown in Figs. 1, 2 and 3, respectively.

As soon as the sliding pusher members 100 are withdrawn the clamping levers on the two carrier links containing the folded covers are released. A simple and efficient means for periodically raising and releasing the clamping levers of successive pairs of links at the cover folding and inserting station comprises a rock arm 113 having at its free end a roll 114 which is positioned to overhang the arms 65 of two adjacent levers, as seen in Fig. 4. This arm 113 is fast on and extends rearwardly from one end of a rock shaft 115 which is mounted in a bearing bracket 116 on the forward portion of the table. Fixed on the other end of the rock shaft is a rearwardly extending arm 117 to which the upper end of a vertical actuating rod 118 is pivoted. The lower end of this rod has an expanded bifurcated portion 119 which is slidably supported on a rocker block 120 loose on the main shaft 44. Such portion has a roll 121 operatively fitted in the race of a cam 122 fast on the main shaft, the contour of which race is such that at the proper intervals of time in the operation of the machine the rod is vertically reciprocated to actuate the rock arm 117 in such manner that at each dwell of the carrier the roll 114 presses down the two opposing lever arms 65 in a manner to raise the clamping arm 62 and permit the insertion of the folded covers in the links. Upon the retraction of the pusher members 100 the rock-arm 117 is lowered to release the lever arms 65 and permit the clamping arms 62 to grasp the underlying folded covers. (See Figs. 1, 4, 10, 25 and 29.)

The covers, clamped in the respective links, are advanced by the carrier to suitable mechanism whereby match strips are subdivided into cards of proper size, and whereby the cards are inserted flatwise into the succeeding covers in each dwell of the carrier. Preparatory to the insertion of the match cards in the respective covers of two adjoining links the clamping arms 62 of such links are raised, and in consequence the upper folds of the covers, by virtue of their resilient hinged connections at their end bends, automatically ascend with the arms to an inclined position, thus opening the covers to permit the free passage of the cards, match heads foremost, between the folds of the respective covers. (See Fig. 26.) When the match cards are thus inserted between the folds of the covers, the clamping arms are released, thereupon gripping and securely holding the associated cards and covers. This done, the carrier continues its progress.

The means herein illustrated for periodically actuating the clamping arms 62 at the match card inserting station is substantially similar to that for actuating such arms at the cover inserting station, to wit,—a vibratory pressure arm 123, a shaft 124 therefor fixed between the spaced ribs 125 of a supporting member on the table; a rearwardly extended arm 126, and a rod 226 having a bifurcated guided portion provided with a roll 127 which is operatively fitted in the race of a suitable cam 128 on the main shaft. (See Figs. 2, 8, 13, 14 and 26.)

Figure 5:
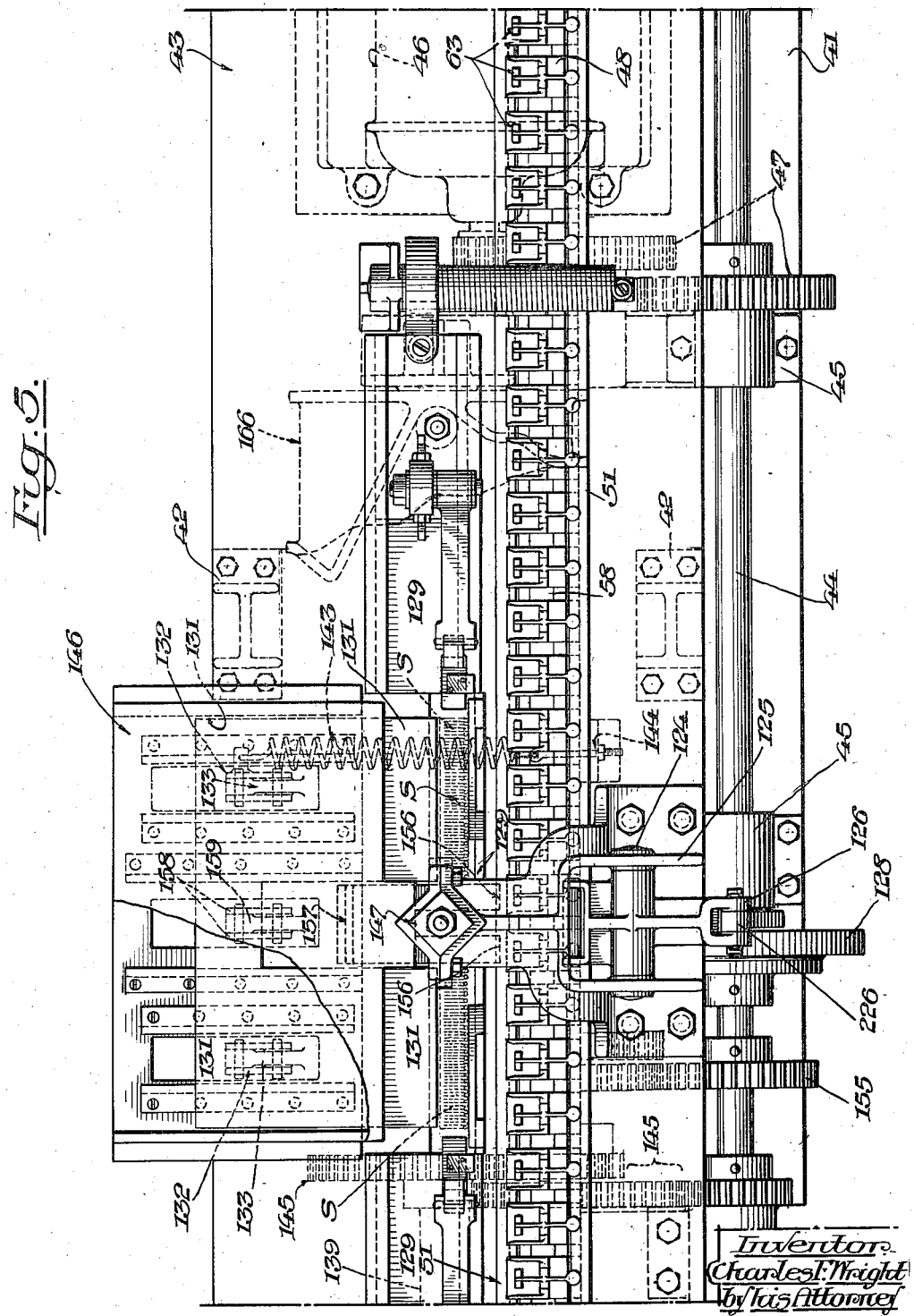

The mechanism herein selected for sub-dividing the match strips and feeding the cards to the carrier links is of known construction and operation, the same being generally similar to that disclosed in the Paridon et al. Patent No. 1,042,472, dated October 29, 1912, except that in the present case the heads of the matches of the match cards first enter the links instead of the butt ends. The construction illustrated is as follows, reference being had to Figs. 2, 5, 8, 13, 14 and 26 of the drawings:

129 designates a horizontal guide formed on a base plate 130 on the table in front of and parallel to the upper run of the carrier, which guide is adapted to receive full-length match strips, S, Fig. 5, in end spaced relation. Where each match book to be produced comprises a single card of matches, individual strips are fed to the guide, but where, as in this instance, each book contains two superposed cards, two strips placed one upon another are fed to the guide.

A transverse bifurcated plunger 131, which is guided on the base plate 130, is connected at its respective ends by links 132, with the upper ends of two spaced arms 133 which are fast at their lower ends on a shaft 134 journaled in brackets 135 on the bed 41. Pivoted to one of the arms is one end of an actuating rod 136, the other or rearward end of which has a bifurcated portion 137 slidably supported on a rocker block 138 loose on a shaft 139 having its bearings in hangers 140 depending from the table. The shaft 139 is driven from the main shaft 44 through a suitable gear train 145, as heretofore. The rod is provided with a roll 141 which is held in contact with the periphery of a cam 142 fast on the driven shaft 139, by means of a spring 143 secured at its ends to the arm and a fixture 144 below the table. The contour of the cam is such that at a proper interval in its rotation the rod 136, the rock-arms 133 and the plunger 131 are moved rearward by the cam against the action of the spring and then retracted by the latter, thus reciprocating the plunger. A cover plate 146, constituting a supplemental table, overhangs the path of the plunger 131 in spaced relation to the carrier, so that when the plunger is in its rearward position match strips, heads leading, can be placed thereon and rearwardly of the table 146. (See Figs. 5 and 14.) This done, when the plunger 131 travels beneath such table and away from the match strips, the strips fall flatwise upon the base plate 130, whereupon in the next succeeding active stroke of the plunger, the opposing strips are pushed toward the carrier with their heads against the guide 129 and their butts below the cutting mechanism which includes reciprocating spaced-apart cutters 246 on a plunger 147 slidably supported in a forwardly extending part of the member 125 previously referred to.

The plunger 147 has a depending actuating rod 148 having a bifurcated portion which is slidably mounted on a rocker block 149 on a sleeve 150 loose on the shaft 139, said portion having a roll 151 which is fitted in the race of a cam 152 fast on the sleeve. This sleeve is actuated in proper time with the main shaft 44 through a train of gears 155 interposed between the two shafts; and the contour of the cam 152 is such as to effect the timed reciprocation of the cutter plunger in order to sever the match strips into conventional match cards. These cards as they are produced are pushed by means of a supplemental plunger 156 into the pair of open covers in alignment therewith in the carrier. The card setting plunger 156 is carried by a slide 157 which is mounted within the feed-table and is connected by means of links 158 with the upper end of a lever 159 which is loose at its lower end on the shaft 134. The lever 159 has pivated thereto one end of an actuating rod 160 having a bifurcated portion which is slidably mounted on a rocker block 161 loose on the sleeve 150, and is provided with a roll 162 operatively fitted in the race of the cam 163 fast on the sleeve, the contour of the cam 163 being such that the rod 160 is actuated to effect the timed reciprocation of the card setting plunger 156.

By suitable operating connections, including cams 166 on the driven shaft 139, the match strips when they are positioned against the guide 129 on the base plate 130 are advanced at intervals longitudinally of the main table and beneath the cutting mechanism preparatory to the cutting of succeeding cards from the strips, all as fully shown and described in Patent No. 1,042,472 aforesaid. The strips may, if desired, be automatically fed in an orderly manner to the supplemental table 146 by conveyer mechanism of the character disclosed in the Paridon Patent No. 1,461,433, dated July 10, 1923.

The associated covers and cards, clamped in the respective links as hereinbefore mentioned, are advanced by the carrier to suitable mechanism whereby in each dwell of the carrier the forwardly projecting coated ends of the lower cover folds are efficiently folded over upon the butts of the match cards in a manner to overlap the free ends of the adjacent upper folds, and thereupon such folded projecting ends, together with the match cards and the backs of the covers, are stapled or otherwise fastened, thus completing the match book.

The means herein illustrated for folding the projecting coated ends of the covers includes a pair of spaced upstanding arms 164 which are arranged adjacent to and forward of the carrier. These arms are pivotally supported at their lower ends by the head 165 of a T-lever 167 which is fulcrumed on a hanger 168 depending from the table. The free end of the lever has a roll 169 which is operatively fitted in the race of a cam 170 fast on the main shaft, the contour of the race being such that the lever is actuated to raise and lower the arms 164 in a proper interval during each rotation of the cam. (See Figs. 9, 15 and 20 to 24, inclusive.)

The upper ends of the arms 164 are provided with rearwardly projecting curved fingers 171, and the bodies of the arms have curved cam projections 172 which in their reciprocatory movement ride against a pair of grooved heads 173 which are fixedly supported on brackets 174 depending from the table. The projections 172 are resiliently held in operative relation to the heads 173 by means of a retracting spring 175 which is secured to one of the arms and to a bracket 176 supported beneath the table.

In each dwell of the carrier the projecting coated ends of the lower folds of two adjacent covers overhang the fingers 171, (as seen in Figs. 21, 24 and 31,) and the two arms are caused to move upward, the fingers 171 thus impinging against the under sides of the opposing projecting ends of the cover folds and forcing them up and against the ends of the respective match cards which at this stage are held down by the clamps. (See Figs. 22 and 32.) As the upward motion of the arms continues their fingers are caused to move over the butts of the match cards by the pressure of the cam projections 172 against the stationary heads 173, thus forcing the folded ends of the covers over upon the opposing butts of the match cards in a manner to overlap the free ends of the upper folds of the covers, as seen in Figs. 15, 23 and 33. Thereupon the overhanging presser feet 177 of a pair of suitably-disposed wire stitchers 178 (Figs. 3, 15 and 16) descend upon the end folds of the covers and hold such folds tightly in place while they are being stitched or stapled. As the presser feet ascend, the arms 164 are returned to their original outward and down position. (Figs. 21 and 31) with the fingers 171 ready for a similar operation upon the next succeeding associated cards and covers held in the carrier.

The wire stitchers herein shown are of known construction. They are supported by brackets 179 on the table 43, and are driven from the main shaft 44 through suitable gearing, comprising a transverse shaft 180 having its bearings in brackets 181 on the bed 41. The rear end of the shaft has fast thereon a bevel gear 182 in mesh with a similar gear 183 on the main shaft 44, and the forward end of the shaft 180 has a sprocket wheel 184 about which passes a chain 185 which is trained about sprocket wheels 186 on the drive shafts 187 of the respective stitchers.

Figure 6:
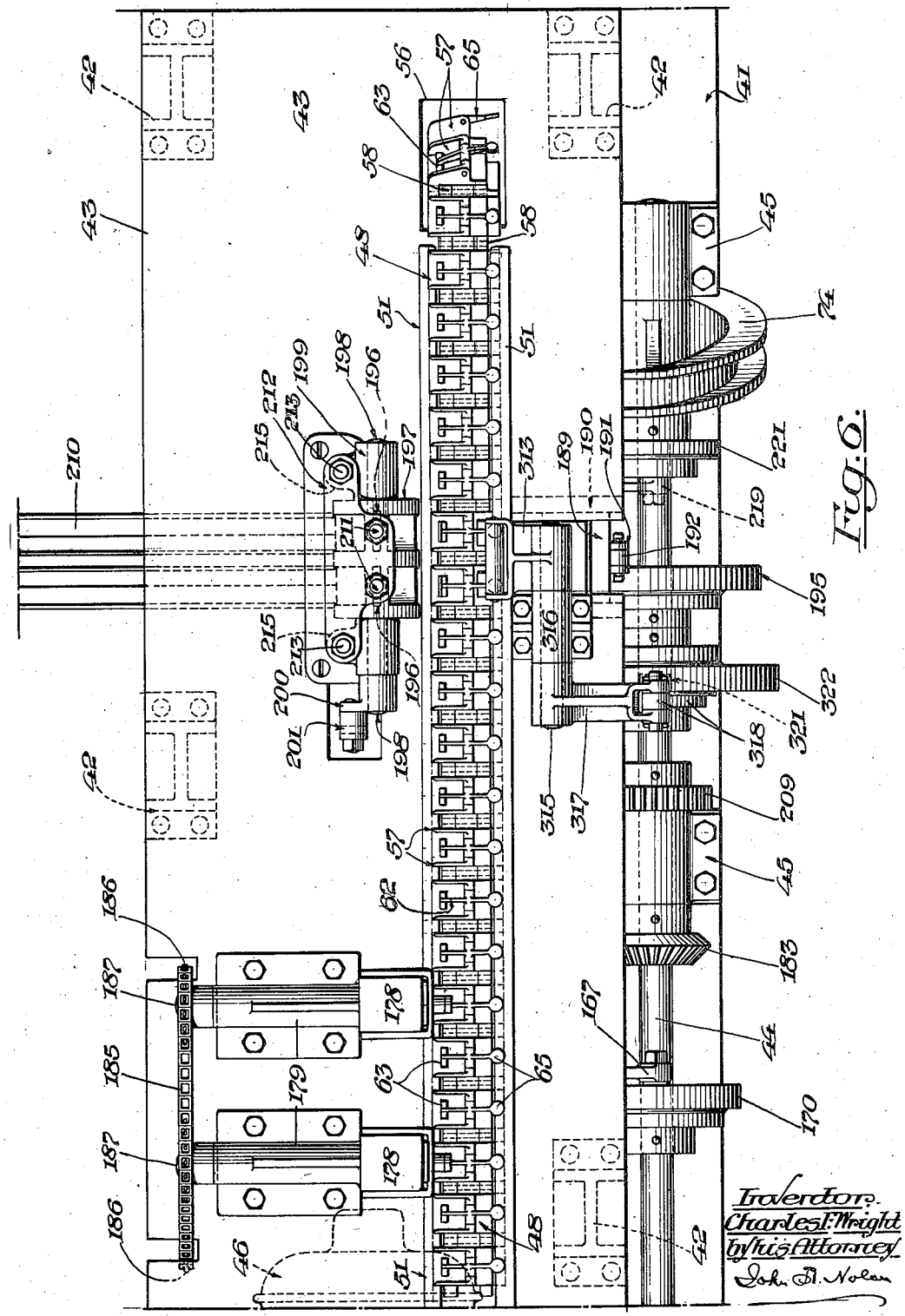
Figure 7:
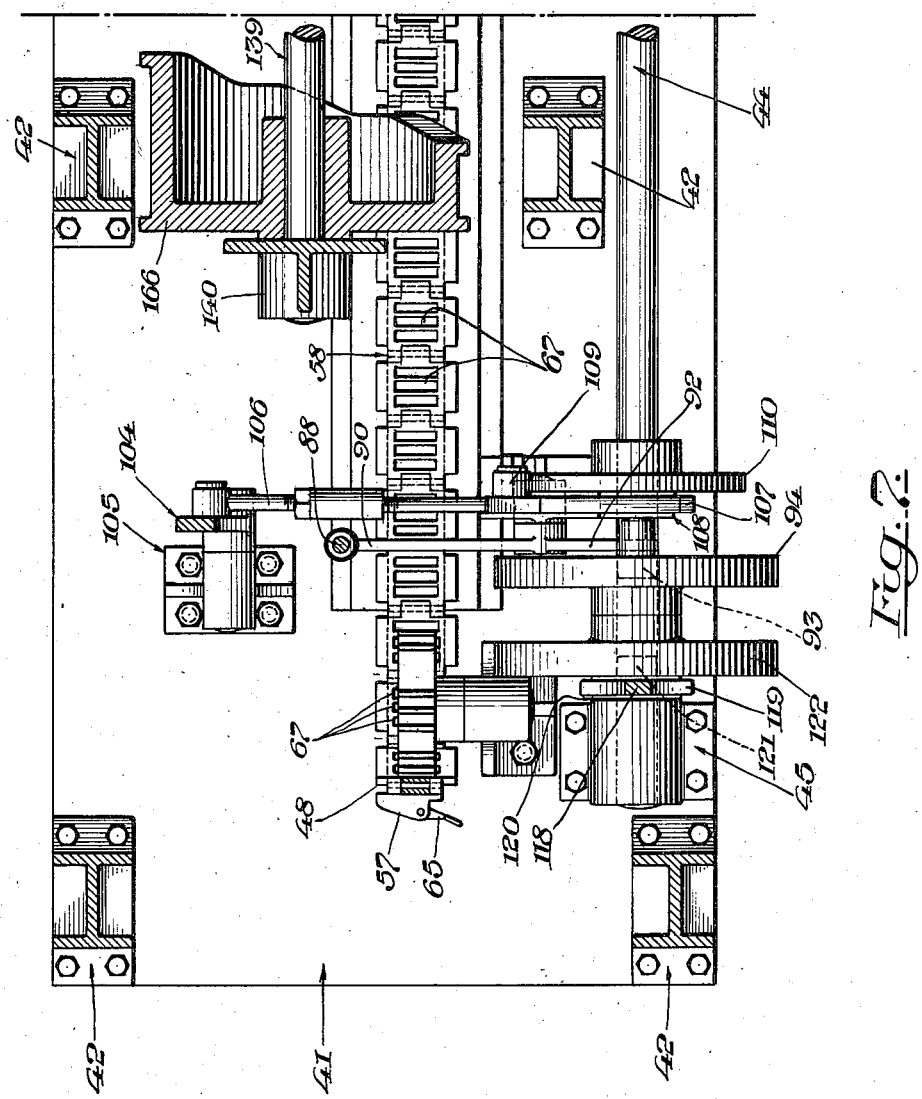
Fig. 7 is a horizontal section, as on the line 7—7 of Fig. 1, showing the main shaft, the cam thereon for operating the cover folding and inserting mechanism, and the cam for operating the clamps of the carrier.
Figure 8:
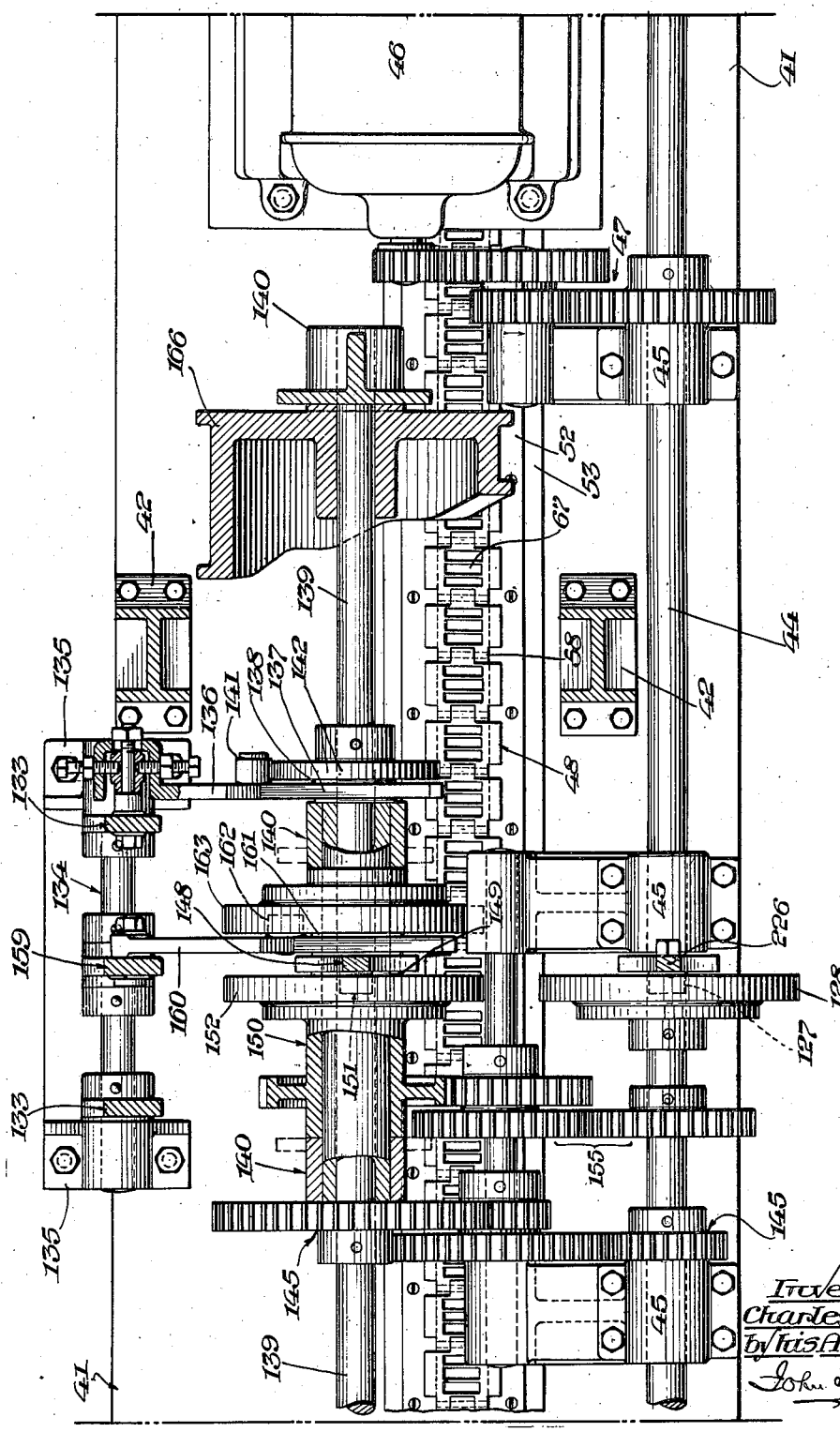
Fig. 8 is a similar section, as on the line 8—8 of Fig. 2, directly above the cam mechanism for actuating the plunger which feeds the match cards to the covers in the carrier.
Figure 9:
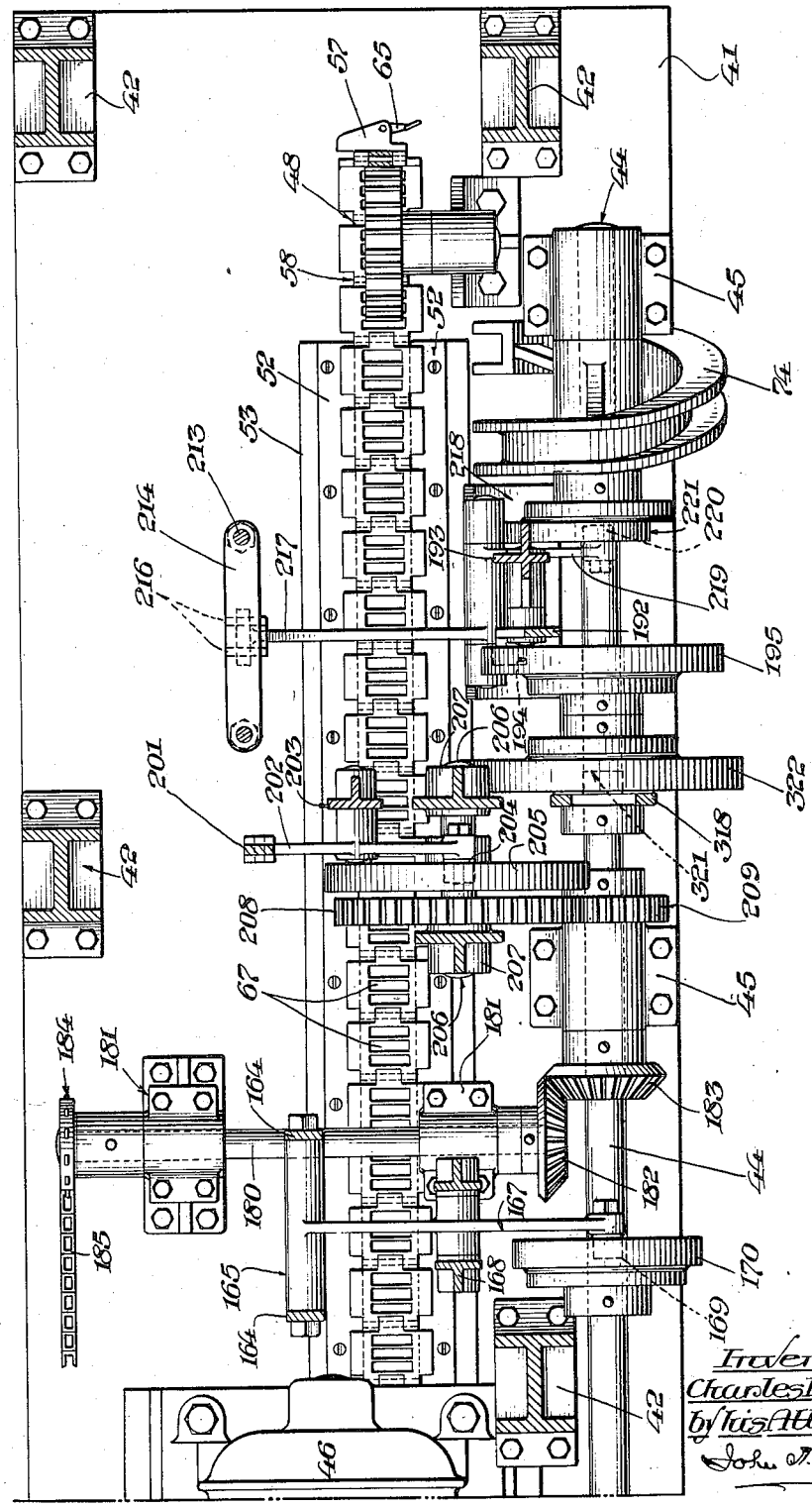
Fig. 9 is a similar section, as on the line 9—9 of Fig. 3, showing the main shaft, the cam thereon for intermittently moving the pin wheel of the carrier actuating mechanism, and the cams and connections for operating the stitching and discharging elements shown in Fig. 3.

The finished books, clamped in the respective links, are advanced by the carrier to mechanism whereby in each dwell of the carrier the books are unclamped and then discharged. The means herein illustrated for periodically actuating the clamping lever arms 62 at the discharging station is similar to that at the cover inserting station for operating such arms, to wit, a vibratory pressure arm 313; a shaft 315 therefor mounted in a bracket 316 on the table 43; a rearwardly extending arm 317, and a rod 318 having a bifurcated guide portion provided with a roll 321 which is operatively fitted in the race of a suitable cam 322 on the main shaft. (See Figs. 3, 6 and 18.)

As each succeeding pair of books in the carrier are unclamped, they are punched out of the links by a bifurcated pusher plate 188 whereof the acting members are reciprocative through the spaces between the corner portions 61 of the respective links. This plate is carried by a transverse slide 189 mounted in guides 190 beneath the table 43. The slide is pivotally connected by links 191 with a lever 192 pivotally mounted on a bracket 193 on the bed, which lever is provided with a roll 194 operatively fitted in and actuated by the race of a cam 195 on the main shaft 44. (See Figs. 3, 16 and 19.)

In the present instance the match books are pushed, pair by pair, into the opposing horizontal slots 196 of an oscillatory cylindrical turret 197, which slots are arranged in pairs extending diametrically of the turret and at right angles to each other, as seen in Fig. 16. This turret is supported by stud shafts 198 which are journaled in bearing brackets 199 on the table 43, and are provided with a crank arm 200 which is connected by a depending link 201 with a lever 202 pivoted on a suitably disposed bracket 203 beneath the table. The rear arm of the lever has a roll 204 which is operatively fitted in a cam 205 fast on a short shaft 206 having its bearings in hangers 207 secured to the table. Fast on the shaft 206 is a spur wheel 208 in mesh with a smaller gear 209 on the main shaft, the ratio of the gears being such that the shaft 206 makes one-half rotation during one complete rotation of the main shaft.

The contour of the cam 205 is such that the lever 202 is actuated to oscillate the turret through an arc of 90° in timed relation to the reciprocation of the plunger 188 so that at the end of one stroke of the turret two slots are positioned horizontally to receive a pair of match books from the carrier, and in the next succeeding stroke are positioned vertically above or below the axis of the turret, the other slots being then in line with the discharge pusher in readiness for the reception of the next succeeding pair of books, which in the following stroke of the turret are vertically positioned reversely of the preceding pair, and so on in alternation.

During each dwell of the turret the vertically-disposed books are pushed through their respective slots and out of the turret into rearwardly extending underlying packing troughs 210 (Figs. 3, 6, 16 and 17) by means of a pair of spaced vertical plungers 211 on the head 212 of a reciprocative gravity frame including in its construction spaced vertical rods 213 and a lower cross-bar 214. The rods 213 are slidably fitted in guides 215 on the table 43, and the cross-bar 214 is connected by means of a pair of links 216 with one arm 217 of a lever which is pivoted on a suitably-disposed bracket 218 on the bed 41. The other arm 219 of the lever is provided with a roll 220 which rests on the periphery of a suitable cam 221 on the main shaft.

Since the pairs of match books which are successively entered in the slots of the turret are positioned thereby alternately in the upper and lower parts of the turret, preparatory to their discharge by the plungers 211, the thin ends of each pair of books are disposed against the thick ends of the adjacent books when they are punched into the underlying troughs 210, thus insuring a uniform assembly of the books within the troughs. The slide 189 carrying the pusher plate 188 which discharges the books from the carrier, is provided on its under side with a bifurcated pusher 222 whereof the acting members extend forwardly into the rear of the respective troughs. Hence during the discharge of the books from the carrier the pusher 222 impinges against and forces forward the books previously deposited in the troughs, thus affording in the latter, directly under the turret, open spaces to receive the next succeeding books ejected from the turret.

It is to be understood that my invention is not limited to the particular constructions herein disclosed, as the mechanisms may be variously modified within the principle of the invention and the scope of the appended claims.

I claim—

1. In a machine for making match books and the like, having a travelling carrier, a receptacle for a horizontal pack of vertically disposed covers, a vertically reciprocating stripper element for removing each succeeding foremost cover from the pack and positioning it vertically adjacent the carrier, means constantly urging the pack of covers against the stripper element, and means for transversely folding the segregated cover and inserting the folded cover in the carrier.

2. In a machine for making match books and the like, having a travelling carrier, a receptacle for a horizontal pack of vertically disposed covers, means constantly urging the pack of covers toward the end of the receptacle near the carrier, a vertically-reciprocating plate constituting such end and having on its inner face a projection which overlies the foremost cover of the pack when the plate is at the limit of its upward stroke, which projection in the downward stroke of the plate removes the opposing cover and positions it vertically adjacent the carrier, said plate having at its lower end a transverse folder space which is positioned in front of the carrier when the plate is at the limit of its upper stroke, and a pusher reciprocable against the segregated depending cover and through the folder space of said plate, thereby transversely folding the cover and inserting it in the carrier.

3. In a machine for making match books and the like, having a travelling carrier, a receptacle for a horizontal pack of vertically disposed covers, means constantly urging the pack of covers toward the end of the receptacle near the carrier, a vertically-reciprocating plate constituting such end and having on its inner face a projection which overlies the foremost cover of the pack when the plate is at the limit of its upward stroke, which projection in the downward stroke of the plate removes the opposing cover and positions it vertically adjacent the carrier, said plate having at its lower end a pair of spaced rolls providing a transverse folder space which is positioned in front of the carrier when the plate is at the limit of its upper stroke, and a pusher reciprocable against the segregated depending cover and through the folder space between the rolls, thereby transversely folding the cover and inserting it in the carrier.

4. In a machine for making book matches and the like, the combination of a carrier comprising a chain of links each embodying a pocketed body having spaced side walls terminating at their rear in interior angular corner portions, a clamping lever on the link, means for opening and closing said lever at predetermined intervals, and means for folding a cover and inserting it between the spaced side walls of the link and against the angular corner portions when the lever is in open position, said means including a reciprocating pusher having its acting end corresponding with the dimensions of the folded leading end of the cover so as to press such folded end squarely against the angular corner portions.

5. In a machine for making match books and the like, each having a front cover fold and a short end fold overlapping the free end of the cover fold, folding mechanism comprising a vertically-disposed member vibratory on a horizontal axis and having at its upper or free end a folding finger which normally lies directly under the short end portion of the cover to be folded, means for vertically reciprocating said member, and means for vibrating said member during its vertical reciprocation, whereby in the upward stroke of the said member the finger thereof bends the opposing portions of the cover upwardly and then over upon the free end of the front cover fold, and in its downward stroke said member returns it to its first position.

6. In a machine for making match books and the like, each having a front cover fold and a short end fold overlapping the free end of the cover fold, folding mechanism comprising a vertically disposed member vibratory on a horizontal axis and having at its upper or free end a folding finger which normally lies directly under the short end portion of the cover to be folded, means for vertically reciprocating said member, means for vibrating said member during its vertical reciprocation, whereby in the upward stroke of said member the finger thereof bends the opposing portion of the cover upwardly and then over upon the free end of the front cover fold, and in its downward stroke said member returns to its first position, and binding means for the short end fold of the cover.

CHARLES F. WRIGHT.